United States Patent Office 3,783,068
Patented Jan. 1, 1974

3,783,068
METHOD OF FORMING FUSIBLE REINFORCED POLYMER FILMS AND RESULTING COMPOSITE STRUCTURE
Gary G. Brown, Diamond Bar, Calif., assignor to Northrop Corporation, Beverly Hills, Calif.
Filed Mar. 12, 1970, Ser. No. 19,081
Int. Cl. B65h 81/00
U.S. Cl. 156—173
16 Claims

ABSTRACT OF THE DISCLOSURE

A method of forming polyamide films reinforced with reinforcing filaments, comprising providing a thin fusible, non-porous film of the polyamide on a filament winding drum, wrapping reinforcing filaments thereon, coating the filaments with additional polyamide resin, staging the material to a tack-free condition, then removing it from the winding drum and applying heat to remove the volatiles from the film. Stacked layers of the film can then be subjected to temperatures and pressures sufficient to fuse and cure the layers into an integrated structure.

DRAWINGS

Figure 1:
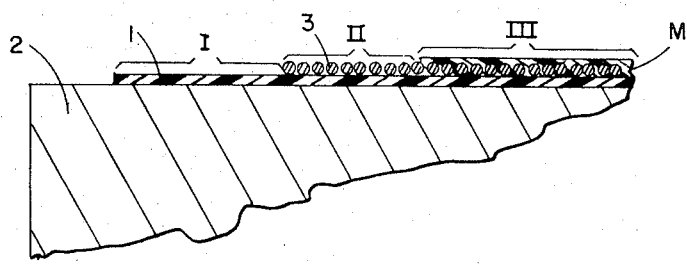
Figure 2:
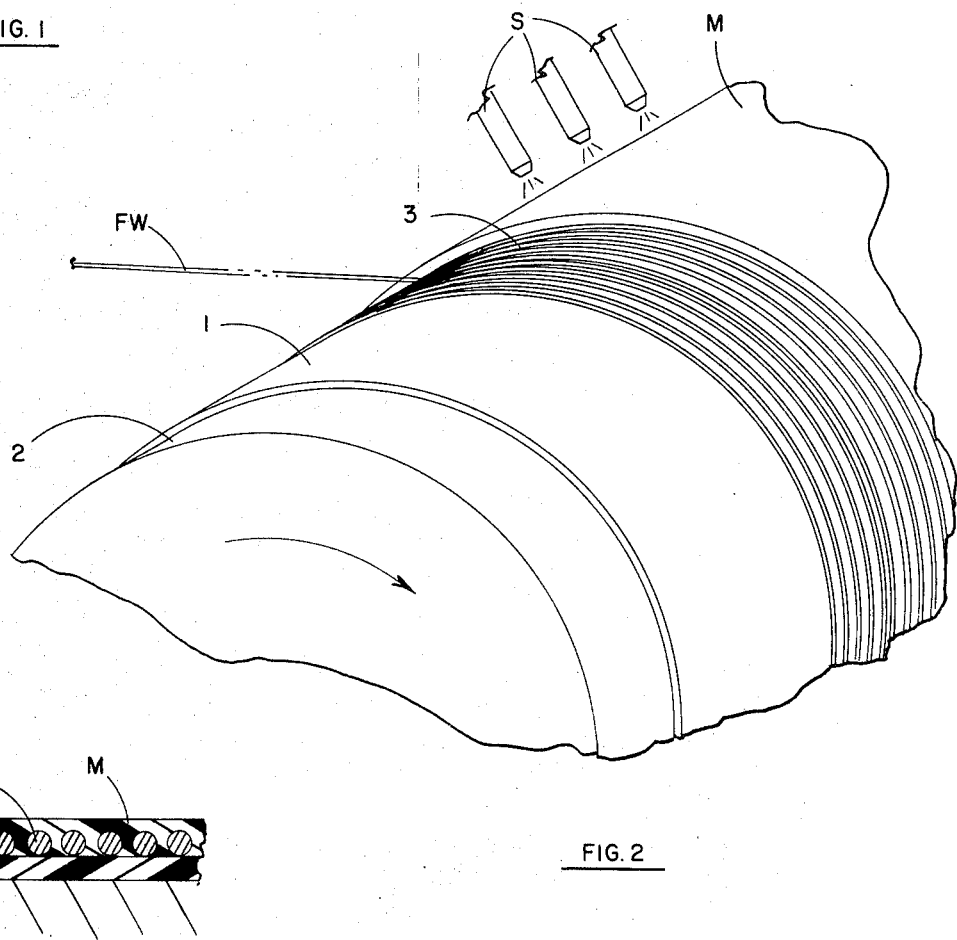
Figure 3:
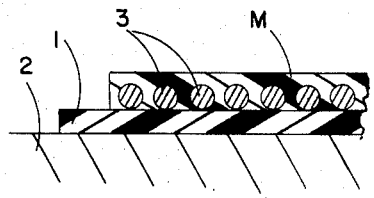

To illustrate an embodiment of the subject invention, the following drawings are provided:

FIG. 1; a schematic section showing of a reinforced film shown in various stages of completion as disposed upon a drum type forming substrate;

FIG. 2; an upper side perspective showing, greatly schematized, of the drum filament-winding means and resin-applying means associated with producing an embodiment like that of FIG. 1; and FIG. 3; an enlarged view of a "finished" portion of the film in FIG. 1.

In co-pending application Ser. No. 799,976, filed Feb. 17, 1969, and assigned to the same assignee now abandoned, there is disclosed laminate structures comprised of polyamide films and reinforcing fibers, including metal filaments, glass, boron and other materials. The application additionally disclosed forming free-standing films of particular polyamides. The invention therein particularly related to the utilization of the polyamide disclosed in U.S. Pat. 3,190,856. To form the composite structures in accord with the method disclosed in the application, layers of free-standing film of the polyamide were initially formed to about 80 percent of final cured state.

Fibers or other reinforcing material were then laid between alternate sheets of the film and the resulting composite subjected to pressure of about 20 p.s.i. and temperature on the order of 400° F. to 600° F., depending upon the degree of cure desired. In one embodiment of the invention, the reinforcing fibers were coated with the resin and then heated to the degree where the resin became tack-free such that the fibers were bonded with the polyamide resin utilized. The bonded fibers were then placed between the sheets of polymer and subjected to temperature and pressure conditions suitable to fuse them into a composite structure.

As can be seen, in accord with the method previously disclosed, a nearly fully cured film of the polyamide was initially formed prior to placing reinforcing fibers between adjacent layers. Further temperature and pressure conditions served to fully cure the polymer and bond the reinforcing elements between the layers thereof. One of the main disadvantages of this prior technique was that the individual film had to be preformed prior to making the composite structure. Additionally, in order to get further improved results, one had to perform a separate step of coating or impregnating the filaments with the resin which then served as an adhesive to bond the filaments together prior to their being disposed between layers of the preformed film. These steps required separate means for forming the film and the impregnated fibers which was both time consuming and costly.

The herein invention is directed to an improved method of forming composite structures utilizing the polyamide films disclosed in the previously filed application. Further, it has been subsequently found that additional polyamide materials are suitable for forming composite structures, particularly when utilized with boron reinforcing elements or filaments. The herein method allows one to essentially form a composite structure of reinforced polymer film in situ without the necessity of initially forming individual free standing films, as disclosed in the prior application. In the present invention, a thin, fusible, non-porous film of a polyamide is provided on a filament winding drum. The polymer film is staged with heat to a near tack-free condition. Boron filament is then wound onto the freshly staged resin film. This is followed by additional polyamide resin being applied onto the boron fibers. The entire material is then further heated to a tack-free condition and subsequently removed from the winding drum. The removed staged tape is cut into desired dimensions for pressure curing and is subjected to additional heating or staging in an oven to a point where about 90 to 95 percent of the solvent containing the resin is removed. Next, layers of the tape are placed in a matched die mold and press cured at a pressure and temperature over a time sufficient to provide a composite of a desired thickness depending upon the number of layers of tape. Alternatively, the layers of reinforced film can be placed in an autoclave to achieve a pressure cure. The product is then cooled and the pressure released. The composite is then subjected to a post-cure to achieve maximum physical properties. Thus, it can be seen that at no stage is a free-standing film required. A handleable reinforced film is initially formed directly on a single winding drum, which can then be removed and subjected to conditions of cure. It is believed that the invention will be further understood from the following detailed description and example:

Any of the particular polyamides disclosed in U.S. Pat. No. 3,190,856 can be utilized in the herein invention. These polyamides are the polymeric condensation product of an aromatic primary diamine, containing from 6 to 16 carbon atoms, with a dianhydride of an acid selected from a group consisting of 2–2',- 3–3'-, 2,3,3',4'-, 3,3',4,4'-benzophenonetetracarboxylic acids and mixtures thereof. A particularly preferred resin is the condensation product of 4,4'-dioxyaniline and the dianhydride of 3,3',4,4'-benzophenonetetracarboxylic acid. Further film-forming polyamides that can be utilized include those disclosed in Canadian Pat. No. 756,179 of Apr. 4, 1967. These materials are high molecular weight polymers of an aromatic primary diamine and an aryl halide derivative of trimellitic anhydride which contains at least one aryl group in the 4-ring position.

The aforegoing are particular polyamide resins that are most suitable for the practice of the present invention. In accord with the herein teaching, any polyamide is suitable providing it will form upon an initial staging a free-standing non-porous fusible film which is not fully cured. This allows one to then stack layers of the reinforced film to a desired thickness. The stacked layers upon being subjected to suitable pressure and temperature conditions will bond together forming a fully cured integral thick structure of the resin having layers of reinforcing elements therein. Commercially available polyamide resins suitable for the present invention include but ae not limited to Monsanto Skybond 704 and the Skybond 6000 series resins made by the Monsanto Co., Dupont 5077 resin made by E. I. du Pont de Nemours &

Co., and the Amoco AI polymer made by the Amoco Chemicals Corp.

The polyamides are normally supplied from the manufacturer dissolved in a solvent or solvents. These solutions as received generally comprise from 18 to 40 weight percent resin solids. As such, the solutions are used to form an initial film. However, the solutions must be further diluted in a suitable solvent prior to being applied as a coating over the wound filaments. Any of the solvents for the polymers disclosed in the aforementioned patents can be utilized for such dilution. These include, for example, dimethyl acetamide, N-methyl pyrollidone, and the like. In order to achieve a desirable outer coating, the solution of solvent and polymer should comprise from 65 to 90 weight percent solvent. The viscosity of the resin solutions will vary greatly depending upon the molecular weight of the particular polyamide. Enough solvent must be added to a given resin solution to provide a sufficiently low viscosity material that can be readily sprayed on the fibers for the outer coating.

In order to perform the process of the invention, a filament winding machine and associated winding drum is utilized. The winding drum is preferably coated with a material that allows for the release of the composite formed on the drum. Thus it is preferred to utilize a film of a material such as Mylar or the like as a coating on the drum. Other materials that can be utilized as a coating for the drum or as a film to cover the surface of the drum would include Teflon and polypropylene. The polymer solution is first spread on the drum by means of a film casting knife to form a thin film of from 0.003 to 0.020 inch thick. The wet polymer film coated on the drum is then staged at a temperature between 100° and 175° F., preferably 160° F., for a sufficient time so that it reaches a tack-free or nearly tack-free condition. This condition is achieved when from 60 to 80 weight percent of the solvent is removed. For example, at 160° F., it is found that this can be achieved in about 40 minutes. Alternatively to casting the film directly on the winding drum, the polyamide can be applied to a flat sheet of Mylar or other suitable release material. This is followed by wrapping the coated Mylar on the winding drum, and then staging the resin. The Mylar is attached to the drum by a double-backed tape or other suitable adhesive means.

After the staging of the initial layer of resin, boron filaments are then wound onto the resulting fusible film. The boron filaments are continuous and have the diameter which can range from 0.0038 to 0.0042 inch. The filaments are wound in a slight helical pattern to provide a single layer on the polyamide film. It has been found that the most desirable composites comprise material where the weight percent of the boron filaments can vary from 48 to 64 percent of the total composite. Thus, the amount of filaments wound onto the film can be determined based on achieving the desired end weight percent in the composite. The weight percent of filaments in the composite is varied by changing the thickness of the resin films or total amount of resin applied to the drum and varying the spacing of the fibers between 0.0003 and 0.001 inch apart. Boron filaments are preferably wound on the filament winding drum with an optimum spacing of approximately 0.0006 inch between fibers or approximately 200–225 fibers per lineal inch of winding.

After the boron fibers have been wound onto the drum covering the initial film of polyamide, additional diluted resin is then painted onto the exposed boron fiber by means of a spray gun, paint brush or similar means. The thickness of this additional polyamide can vary from 0.001 to 0.010 inch. Actually, enough polyamide is required to merely cover the exposed fibers. The freshly prepared tape is then staged at from 100 to 175° F. for from 30 to 150 minutes to a point where the outer layer of polyamide is just tack-free. During this period of time, additional curing and solvent removal occurs.

The staged tape is cut and removed from the drum. It is then further cut into the desired dimensions for curing under pressure. The Mylar backing is then simply peeled off from the tape. Cut pieces of tape are then subjected to additional staging in an oven which can vary from 275 to 350° F. for a period of time so that approximately 90 to 95 percent of the solvent contained in the resin is removed. For example, at 325° F. for a period of time so that approximately 90 to 95 percent of the solvent contained in the resin is removed. For example, at 325° F. it has been found that 95% of the solvent is removed in 35 minutes of heating. Layers of the staged tape are stacked to a desired thickness and then laid into a die mold. The layers are then press cured in a press having heated platens at a temperature of from 400° to 625° F.

While the tape is in the mold at the foregoing temperature range, it is subjected to a pressure which can vary from 20 to 200 p.s.i. It has been found, however, that at 100 to 200 p.s.i. more reproducible mechanical strengths are obtainable and thus these higher pressures are preferred. The temperature and pressure of the curing is maintained for a sufficient time to obtain a complete cure of the resin to where it becomes infusible or nearly infusible. For example, at 600° F., and at a pressure of 150 p.s.i., the material will be fully cured in about one hour.

Alternative to press curing, the stacked layers of tape can be placed in a conventional autoclave maintained at 400° to 450° F. for from 1 to 4 hours. Pressure in the autoclave can vary from 100 to 200 p.s.i.

After the curing of the tape, the press or autoclave is preferably cooled down to a temperature below that at which volatiles are formed. Thus it is preferred to cool down to below 212° F. The formed product is then subjected to a post cure at the curing temperature and ambient pressure. Such products can be used as lightweight structural members for high temperature applications. The length of post cure is determined by routine experimentation for a given composite and will be the point where maximum strength properties are obtained. After post cure, the composite is ready for utilization. Referring now to the figures the section view in FIG. 3 will be evident as illustrating a finished reinforced film embodiment, comprising an array of reinforcing fibers 3 embedded in a resin matrix M and bonded onto a supporting carrier layer 1 of like polyamide resin; this resin layer 1 acting as a carrier for the filaments and embedding resin, and being itself understood as formed upon a drum surface 2. The succesive stages of the preferred forming method are somewhat graphically indicated in FIG. 1, wherein phase I is intended to indicate the operation of casting the first (carrier) resin layer 1 onto filament-winding drum; phase II indicates the lay-up of reinforcing filaments whereby the filaments are disposed upon the carrier film 1; and phase III indicates the embedding of these filaments in a second, covering resin layer M, bonding them to the underlying carrier film 1.

Similarly, FIG. 2 indicates, very schematically, a type of fabrication apparatus generally applicable, as understood by those skilled in the art, for forming an embodiment such as that of FIGS. 1 and 2. Here, the forming substrate comprises the winding surface of a rotatable winding drum D, with carrier film layer 1 being shown exposed on one portion thereof—on a second portion the reinforcing segments 3 are shown, comprising an endless length of filaments would spirally (by filament supply means FW, not illustrated, but generally understood in the art) as drum D is rotated—in a third portion, the second (cover matrix) layer M is shown covering a portion of the filaments, being applied thereto by a plurality of sprayheads S through which the polyamide resin material may be dispensed (including solvent) as drum D is rotated. Of course, any equivalent arrangement known in the art may likewise be used.

Those skilled in the art will understand that this arrangement, while schematically shown here, may readily be implemented by other equivalent means well known in the art, and that such a showing is not intended to limit the equivalent means used. As specifically indicated in FIG. 3, the fibers 3 may be applied to the surface of carrier film 1 when the latter is somewhat "soft" and pliable, so they will "sink in," and become partially embedded in, the exposed surface of layer 1—this preferably occurring upon the application of covering resin M which, since it incorporates a considerable portion of solvent, will soften the surface of layer 1 when contacting it and so induce this "sinking," as it coats and covers the fibres 3 bonding them with the carrier layer 1.

It is believed the invention will be better understood from the following detailed examples:

EXAMPLE I

A composite of this invention was formed using Monsanto 704 polyamide resin made by the Monsanto Co. This resin is furnished by the manufacturer as a solution containing 27 weight percent resin solids.

A thin film having a thickness of 0.010 inch was cast on a sheet of Mylar film with a film casting knife. The coated film was attached to an 8½ inch diameter winding drum along 9¼ inches of its length.

The resin was then staged to a near tack-free condition by heating with infrared lamps at a temperature of 150° F. for 45 minutes. The film was then allowed to cool to room temperature.

The boron reinforcing fiber used was in continuous lengths having a diameter between 0.0038 and 0.0042 inch. The single layer of fibers was wound on the staged film at a spacing of 0.0006 inch between fibers.

A dilute solution of the resin was formulated by adding sufficient N-methylpyrollidone to the received resin solution to reduce the resin solid content to 15 weight percent. The dilute solution was then sprayed on the boron fibers to completely cover them.

The resulting impregnated boron fibers were then staged until the resin became tack-free. This was done by heating the film with infrared lamps at 160° F. for one hour. The film was then allowed to cool to room temperature and the staged film was then removed from the drum.

The removed film was then cut in pieces 4½ by 4½ inches. The pieces were then placed in an oven and heated at 340° F. for 20 minutes. At this point, at least 90 weight percent of the solvent was removed.

The staged sectioned film was then cured by stacking eight cut pieces in a mold. The mold was then placed in a heated press which was controled at 390° F., under contact pressure for 3 minutes. The temperature was allowed to increase to 425° F., at which time the pressure was increased to 200 p.s.i. The temperature contined to rise to 600° F. The pieces were kept at 600° F. for ½ hour under the 200 p.s.i. to achieve a cure.

The press was then cooled to 200° F. under pressure of 200 p.s.i. At 200° F., the pressure was released and the mold removed from the press. The composite was then post cured for 10 hours at 600° F. under ambient pressure. The resulting composite had the following properties:

| | |
|---|---|
| Tensile strength, avg. p.s.i. | 180,000 |
| Short beam shear, avg. p.s.i. | 11,000 |
| Specific gravity grams/cc | 1.98 |
| Void volume percent | 2.5 |
| Fiber volume do | 57.0 |

EXAMPLE II

Example I was repeated using an autoclave in place of a press. The stacked pieces were heated at 450° F. for 1½ hours at 200 p.s.i. in the autoclave. The resulting product had the same physical properties as set forth in Example I.

What is claimed is:

1. A method of fabricating a multi-layer laminate including a pair of polyamide films, one of which is reinforced, this method comprising:
   (a) casting a fusible, non-porous support film of a polyamide resin on a drum surface;
   (b) laying-up a layer of reinforcing filaments atop this film;
   (c) then, coating these filaments with a layer of liquid polyamide resin substantially the same as the said polyamide resin used to form said support film and chemically compatible therewith, at least sufficient to cover these filaments and bond them to the said underlying support film;
   (d) next, heat-drying the composite so formed on the said drum surface, sufficient for the resin to become tack-free; and
   (e) removing this composite from the drum surface and drying it at least enough to remove a substantial portion of the solvents present in all the resin.

2. The method of claim 1 further comprising:
   stacking pieces of the formed re-inforced film to a desired thickness, and
   subjecting said stacked pieces to a sufficient temperature and pressure to fuse the pieces into a unitary structure.

3. The method of claim 2, wherein, said stacked pieces are heated to between 400° F. and 625° F. at a pressure between 20 and 200 psi.

4. The method of claim 3 further comprising: subjecting said unitary structure to a post-cure heating at ambient pressure for a time sufficient to maximize its physical properties.

5. The method of claim 1, wherein, said fibers are boron.

6. The method of claim 5 wherein weight percent of the boron fibers can vary between 48 and 64 weight percent of the resulting structure.

7. The method of claim 1 wherein the fusible polyamide film cast on the drum is between 0.003 and 0.020 inch thick.

8. The method of claim 1 comprising heating the cast film between 100 and 175° F. for a sufficient period of time so that it becomes at least about tack-free.

9. The method of claim 1 comprising: winding the fibers at a uniform spacing sufficient to provide 200 to 225 fibers per lineal inch.

10. In a method for forming a reinforced composite film of fusible non-porous polyamide resin, wherein one cross-sectional portion of the film is reinforced by a layer of filamentary reinforcement segments extending along a prescribed reinforcement plane through this cross-section and wherein this films also includes a non-reinforced cross-sectional zone adjacent this reinforcement plane, but spaced therefrom, the improvement comprising the steps of:
   first, separately forming this non-reinforcement zone by spreading a prescribed layer of this resin on a drum surface; and
   allowing this layer to dry in situ, at least sufficient to solidify the upper surface thereof;
   then, disposing the layer of said filamentary segments on said upper surface atop this dried film so that said filamentary segments are relatively parallel to one another; and
   then, applying a second layer of the said resin to the filaments so disposed, at least sufficient to cover the filaments and bond them with the said first resin layer and drying this layer in situ.

11. The method as recited in claim 10 wherein said first film layer is prepared to include sufficient compatible solvent therein to render it spreadable; and wherein, after application of the first layer, enough of this solvent is driven-off and the resin layer sufficiently dried to render its exposed surface relatively "tack-free."

12. The method as recited in claim 11 wherein said second layer is prepared so as to include at least as much compatible solvent as with the first layer, and sufficient to render it "workable"; and wherein, once this second layer is so applied, the entire composite is then dried sufficient to remove on the order of 90% or more of the solvent and so render a multi-layer laminate.

13. The method as recited in claim 12, wherein the solvent drying is conducted by heating long enough to remove 90% or more of the solvent at a temperature somewhat less than that necessary to cure or cross-link the film.

14. The method as recited in claim 12, wherein said filaments comprise boron fibre segments constituting on the order of 48 to 64 weight percent of the resulting composite structure and spaced apart uniformly and sufficient to provide on the order of 200 to 225 fibres per lineal inch across the composite.

15. The method as recited in claim 14 wherein the said first film layer is prepared to comprise a polyamide resin layer about 3 to 20 mils thicks and is formed by casting onto the surface of a winding drum and wherein said boron fibres are on the order of a few mils thick.

16. The combination as recited in claim 15, wherein the initial heating of the cast first layer is conducted so as to maintain it between about 120-175° F., long enough to render it "tack-free."

References Cited

UNITED STATES PATENTS

| | | | |
|---|---|---|---|
| 3,556,922 | 1/1971 | Green et al. | 161—152 X |
| 3,262,826 | 7/1966 | Balkin et al. | 156—172 X |
| 3,250,655 | 5/1966 | Adler | 156—302 X |
| 3,190,856 | 6/1965 | Longmeadow et al. | 260—32.8 X |
| 3,046,170 | 7/1962 | Toulmin, Jr. | 161—156 X |
| 2,244,845 | 6/1941 | Matthews | 156—163 X |
| 3,607,561 | 9/1971 | Hutz | 156—137 X |

CARL D. QUARFORTH, Primary Examiner

E. E. LEHMANN, Assistant Examiner

U.S. Cl. X.R.

161—156, 170; 156—137, 174, 272